United States Patent [19]

Sakamoto et al.

[11] Patent Number: 5,487,534
[45] Date of Patent: Jan. 30, 1996

[54] LAMINATED RUBBER VIBRATION CONTROL DEVICE FOR STRUCTURES

[75] Inventors: Mitsuo Sakamoto; Norihide Koshika; Isao Nishimura; Katsuyasu Sasaki; Satoshi Oorui, all of Tokyo, Japan

[73] Assignee: Kajima Corporation, Tokyo, Japan

[21] Appl. No.: 315,697

[22] Filed: Sep. 30, 1994

Related U.S. Application Data

[62] Division of Ser. No. 976,437, Nov. 13, 1992.

[30] Foreign Application Priority Data

Nov. 15, 1991 [JP] Japan ................................ 3-300408

[51] Int. Cl.⁶ ........................................................ F16F 7/00
[52] U.S. Cl. ........................................ 267/141.1; 52/167.7
[58] Field of Search ........................ 267/141, 141.1, 267/141.2, 141.3, 141.7, 136, 152, 153; 52/167 E, 167 EA, 167 R, 167 DF; 248/632, 634

[56] References Cited

U.S. PATENT DOCUMENTS 3,134,585  5/1964  Trask .................. 267/141.1 X

FOREIGN PATENT DOCUMENTS 0215824  9/1986  Japan ................... 267/141.1
0156171  6/1988  Japan .
0199938  8/1988  Japan ................... 267/141.1

*Primary Examiner*—Robert J. Oberleitner
*Assistant Examiner*—Peter M. Poon
*Attorney, Agent, or Firm*—James H. Tilberry

[57] ABSTRACT

A laminated hollow rubber damper with increased buckling strength and lengthened period of vibration. The buckling strength of a hollow laminated rubber damper is increased by making at least the inside or the outside wall of the damper of non-uniform section, such as obtained with an arcuately concave wall. By taking advantage of the improved buckling strength of hollow laminated rubber dampers, both the deformability in a horizontal direction and the period of the damper are increased. The hollow laminated rubber damper may be used as a spring element in an active or passive type vibration control device, or as a supporting device suitable for the protection of structures having long natural periods, such as multi-storied buildings.

16 Claims, 5 Drawing Sheets

LAMINATED RUBBER VIBRATION CONTROL DEVICE FOR STRUCTURES

This application is a division of application No. 07/976,437 filed Nov. 13, 1992, pending.

BACKGROUND OF THE INVENTION

1. Field of the Invention

The field of the invention is the employment of damper means to support structures for controlling the vibration caused by external forces.

2. Description of the Prior Art

Laminated rubber supports for structures have been developed, as illustrated in the Nikkei Architecture issue of Jul. 14, 1986, pp. 54–75. The conventional prior art laminated rubber support comprises vertically stacked layers of solid rubber between which steel plates are interposed. The resultant lamination is sandwiched between upper and lower steel plates which provide means for securing the lamination to upper and lower structures, such as a building superstructure and its foundation.

Conventionally, a solid laminated rubber support used in a structure's base isolation structure deforms proportionally to its height. However, the diameter of the support must be reduced in order to reduce shearing stiffness. Therefore, two desirable physical properties of a solid prior art laminated rubber support, i.e., high deformation modulus and low shearing modulus, have heretofore been difficult to obtain simultaneously.

As shown in prior art FIGS. 18 and 19, reduction of shearing modulus and increase in deformation modulus have been attempted by forming a hollow laminated rubber support. In so doing, however, the resistance of the support against buckling is reduced.

With reference to laminated rubber supports for uses other than as base isolation means, they have been known for use as springs in passive type vibration control devices and as spring elements or supporting devices in active type vibration control devices for controlling the vibration of a structure by applying a control force such as with oil pressure or electromagnetic force. In these vibration control devices, normally the natural period of the spring is synchronized with the natural period of the structure or it is set to be a period longer than the natural period of the structure (e.g., in the case where the vibration control device is used as a supporting device.) A large stroke becomes necessary for getting a large seismic response control from a compact device. For example, an active-type vibration control device as disclosed in Japanese Pat. Laid-open No. 1275866 is constructed with a weight which is hung from an upper steel frame and supported horizontally by pulleys and hanging members and in a way that the weight is capable of making relative movement against a building. The weight is connected to the building through a hydraulic cylinder. With direction from a control device, the weight pushes the cylinder through a hydraulic servo valves. The center of the cylinder is supported by a pin at the center of gravity of the weight and a piston of the cylinder is fixed with a pin to a fixing part of the building. However, there is a problem with this device in that the resulting movement in a vertical direction is also increased accordingly as the stroke becomes longer. In addition, when the natural period of a structure as a seismic response control object becomes longer, it becomes harder to use the laminated rubber supports having the period matching to such a device as described above.

There is still a further problem, when vibrating the weight by means of the actuator as described, that the vibration due to the drive is transmitted to the building, resulting in the transmission of noise and undesirable vibration in the floor upon which the device is installed.

SUMMARY OF THE INVENTION

In a first embodiment of the invention, the laminated rubber support of the present invention is ring shaped to make the internal portion thereof hollow. In addition, the inside wall, the outside wall, or both, may be arcuately concave so as to provide a vertical non-uniform section wherein the widths of horizontal sections will gradually increase from the center portion to the opposite end portions. By contouring the walls of the structure as above described, it has been found that the buckling strength of the laminated rubber is increased to fully make use of the deformability of the hollow laminated rubber device.

In a second preferred embodiment of the present invention, a plurality of vertically aligned ribs are provided integral with the inside wall, the outside wall, or both walls. These ribs stiffen the device against buckling so that full use may be made of the deformability of the hollow laminated rubber support.

Normally, steel horizontal connection plates or the like are mounted on the upper and lower portions of these laminated rubber supports, and are used to secure the supports with bolts to upper and lower structural bodies. The rubber laminations may be separated and reinforced by steel plates interlaid between layers of rubber. The steel plates may be ring-shaped or disk-shaped. The disk-type steel plates render the laminated rubber support more stable against an overturning moment or the like, in comparison with the ring-shaped steel plates.

The above-described vibration control laminated rubber support functions as a spring element in either a passive or active type vibration control device.

In use as a dynamic damper, the laminated rubber support is positioned, with like supports at predetermined positions relative to a supported structure, as seismic response control means in conjunction with an additional body of predetermined mass $m_d$ mounted on the laminated rubber supports. It is considered that the mass $m_d$ of the additional mass body is within the normal range of $\frac{1}{50}$ to $\frac{1}{100}$ of a mass $m_1$ of the structure. By use of a laminated rubber support with a non-uniform section or with rib projections, a spring with a constant $k_d$ having a large deformability in a horizontal direction is formed with a long period corresponding to the natural period of the supported structure.

The subject inventive laminated rubber supports may be used, for instance, with:

(a) An actuator for applying a control force u(t) corresponding to the vibration of the structure between the structure having a mass $m_1$ and the additional mass body having a predetermined mass $m_d$.

(b) A spring having a predetermined spring constant $k_d$ between the structure and the additional mass body in the construction of the above-described (a) synchronizes the period in the case of freely vibrating the additional mass body with the natural period of the structure.

(c) A double mass damper provides a second additional mass body having a predetermined mass $m_b$ for an additional mass body having a predetermined $m_a$ which allows a control force u(t) between the first additional mass body and the second additional mass body, and synchronizes the periods of the first additional mass body $m_a$ and a second additional mass body $m_b$ with the natural period of the structure using a spring with a spring constant $k_b$, in which a control force u(t) is applied between the first and second additional mass bodies.

In the case of active mass dampers, the laminated rubber supports may be used to support the additional mass body in a vertical direction, as a spring for keeping a neutral position with respect to horizontal deflection. The spring should have a longer period than the natural period of the structure so as not to be counter-productive when the control force u(t) is applied.

As to the noise and vibration problems associated with active mass dampers, these problems are reduced when the additional mass body is supported by the inventive laminated rubber supports.

OBJECTS OF THE INVENTION

Accordingly, it is an object of the present invention to provide a laminated rubber support having a high buckling strength, great deformability, little shearing stiffness, and a long vibration period.

It is another object of the present invention to provide an active or passive vibration control device which functions as a large spring and/or a supporting device having a large stroke and a long period and which is suitable to a structure having a long period such as a multi-storied building.

It is a further object of the present invention to provide a vibration control device which can reduce noise and vibration in the structure-supporting floor, wherein the vibration control device includes an additional mass body mounted on the inventive devices.

It is a still further object of the present invention to provide a vibration control device which is suitable to a structure having little friction and a long period by using the above-described inventive laminated rubber supports.

It is a yet further object of the present invention to provide a compact vibration control device of simplified construction in which the above-described inventive laminated rubber supports function as damping springs.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

As used in this description of the invention, the term "ring" shall mean any flat member with a center opening, including first polygonal-sided members with a center opening. The term "disk" shall mean any flat member with no center opening, including flat polygonal-sided members with no opening.

Figure 1:
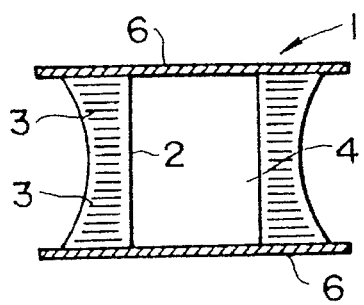
FIG. 1 is an elevational view in section of a preferred embodiment of the present invention reinforced with ring-shaped steel plates.
Figure 2:
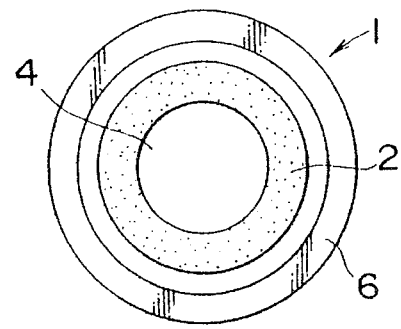
FIG. 2 is a plan view of a preferred embodiment of the invention taken along the line 2—2 of FIG. 1.

FIGS. 1 through 7 show laminated rubber supports 1 with arcuately concave walls as preferred embodiments of the present invention. FIGS. 1 and 2 show a hollow laminated rubber support 1 having a plurality of ring-shaped rubber pads 2 alternating between ring-shaped steel plates 3 laminated with rubber pads 2 to form arcuately concave exterior wall 2A and vertical interior wall 2B. Upper and lower steel plates 6 are rigidly secured to the upper end 6A and lower end 6B of the laminated rubber support 1. Upper and lower plates 6 may be secured to upper and lower structural bodies, not shown, with threaded fasteners such as bolts.

Figure 3:
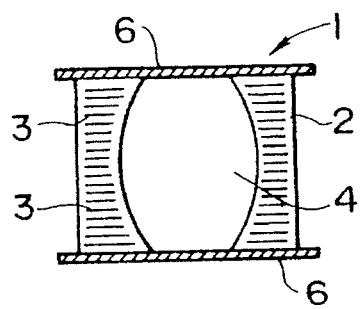
FIG. 3 is an elevational view in section of another preferred embodiment of the present invention.
Figure 4:
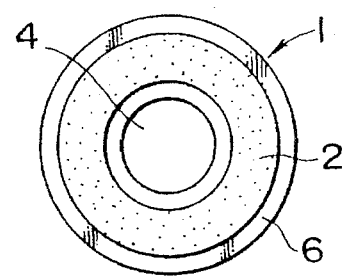
FIG. 4 is a plan view of a preferred embodiment taken along the line 4—4 of FIG. 3.

In contrast to FIGS. 1 and 2, in the device of FIGS. 3 and 4, the interior wall 2D is arcuately concave, whereas it is the exterior wall 2C which is vertical.

Figure 5:
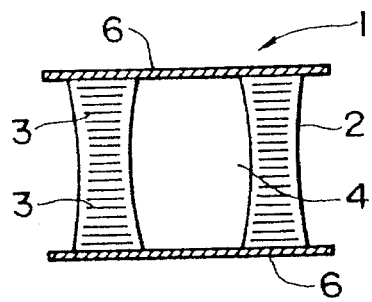
FIG. 5 is an elevational view in section of a further preferred embodiment of the present invention.
Figure 6:
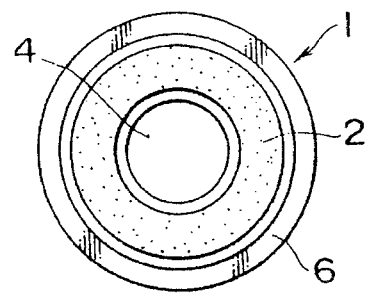
FIG. 6 is a plan view of a preferred embodiment taken along the line 6—6 of FIG. 5.

In the embodiment of FIGS. 5 and 6, both the exterior wall 2E and the interior wall 2F are arcuately concave, although not as pronouncedly so as walls 2A and 2D of FIGS. 1 and 3, respectively.

Figure 7:
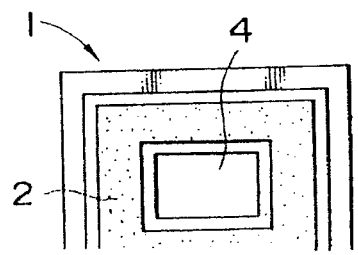
FIG. 7 is a plan view in horizontal section of a rectangular preferred embodiment of the invention.

The device of FIG. 7 illustrate that in one embodiment of the inventive device, the horizontal cross section of the device may be rectangular, rather than circular, in certain applications. In the case where the outer shape of the device is circular, the shearing stiffness of the laminated rubber is the same in all direction. On the other hand, when the outer shape of the laminated rubber is made rectangular or elliptic, the shearing stiffness can be varied depending on the direction of the seismic impact. For example, in the case where the natural period of the laminated rubber support as a base isolation or a seismic response control device varies depending on the direction of the force, effective base isolation and seismic response control become possible by altering the shearing stiffness depending on the direction of stress. Even with respect to the annular cross sections of interior walls 2B, 2D, and 2F of FIGS. 1, 3, and 5, respectively, exterior walls 2A, 2C, and 2D may be rectangular or elliptic to give the laminated rubber support customized shearing stiffness.

Figure 20:
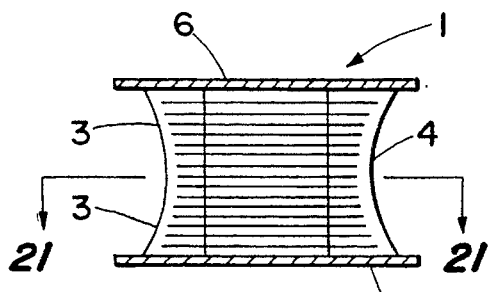
FIG. 20 is an elevational view in section of a preferred embodiment of the invention similar to the embodiment shown in FIG. 1, but reinforced with disk-shaped steel plates.
Figure 21:
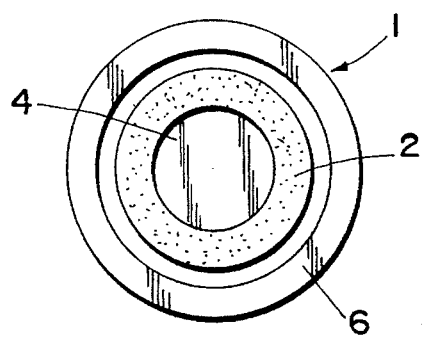
FIG. 21 is a plan view of a preferred embodiment of the invention taken along the line 21–21 of FIG. 20.
Figure 22:
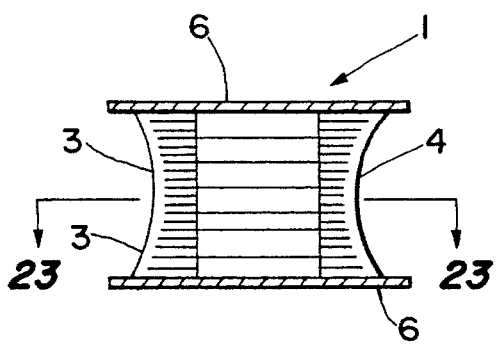
FIG. 22 is an elevational view in section of a preferred embodiment of the invention similar to FIGS. 1 and 20, but reinforced with ring-shaped steel plates and disk-shaped steel plates.
Figure 23:
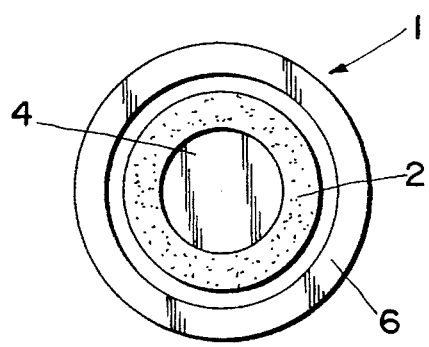
FIG. 23 is a plan view of a preferred embodiment of the invention taken along the lines 23—23 of FIG. 22.

As shown in FIGS. 20 and 21, disk-type plates 3A may be used in lieu of ring-shaped plates 3. In the alternative, as shown in FIGS. 22 and 23, disk-type plates 3A may be interposed between the ring-shaped plates 3. By selectively interposing disk-type steel plates between ring-shaped plates, localized deformation may be controlled, resulting in more stable construction.

FIGS. 8 through 14 show preferred embodiments of the laminated rubber supports 1A with reinforcing ribs 5.

Figure 8:
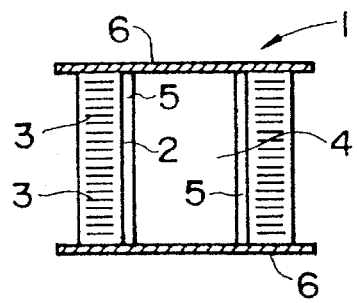
FIG. 8 is an elevational view in section of a preferred embodiment of the present invention having interior wall reinforcing ribs and ring-shaped steel reinforcing steel plates.
Figure 9:
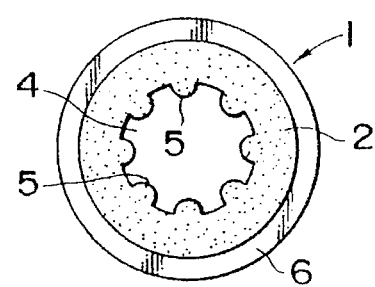
FIG. 9 is a plan view in horizontal section of a preferred embodiment of the invention taken along the line 9—9 of FIG. 8.
Figure 10:
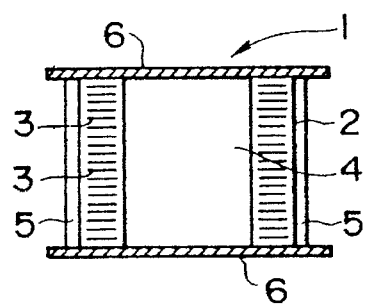
FIG. 10 is an elevational view in section of another preferred embodiment of the present invention having exterior wall reinforcing ribs.
Figure 11:
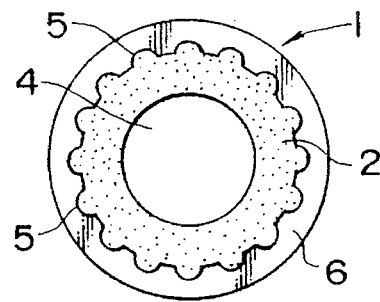
FIG. 11 is a plan view in horizontal section of a preferred embodiment of the invention taken along the line 11—11 of FIG. 10.
Figure 12:
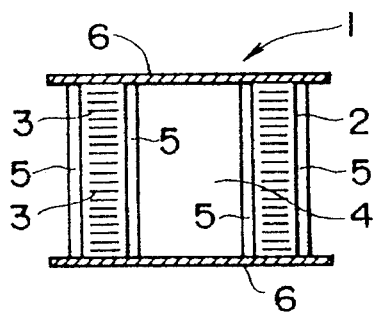
FIG. 12 is an elevational view in section of a further preferred embodiment of the present invention having both interior and exterior wall reinforcing ribs.
Figure 13:
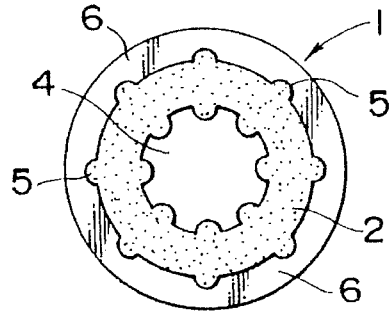
FIG. 13 is a plan view in horizontal section of a preferred embodiment of the invention taken along the line 13—13 of FIG. 12.

The preferred embodiment of the invention shown in FIGS. 8 and 9 includes a plurality of vertical, circumferentially evenly spaced-apart, reinforcing ribs 5 projecting laterally from the interior wall 2G to stiffen the rubber laminated support against buckling. By improving the buckling strength in this manner, it is possible to more fully make use of the deformability of a hollow laminated rubber structure 1 having little shearing stiffness. In like manner, a plurality of vertical reinforcing rubs 5A are formed on the external wall surface 2H of the laminated rubber support 1 in the preferred embodiment shown in FIGS. 10 and 11. In the preferred embodiments of the invention shown in FIGS. 12 and 13, reinforcing ribs 5A are formed on the external wall surface 2H of the laminated rubber support and reinforcing ribs 5B are formed on the internal wall surface 2I.

Figure 14:
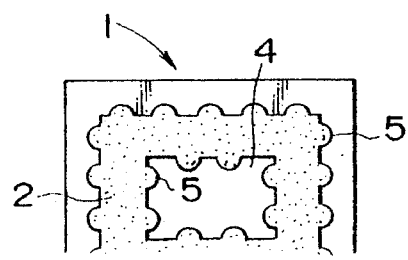
FIG. 14 is a plan view in horizontal section of a rectangular preferred embodiment of the invention.

FIG. 14 shows a rectangular laminated rubber support similar to FIG. 7, but in addition having external wall reinforcing ribs 5C and internal wall reinforcing ribs 5D.

Figure 24:
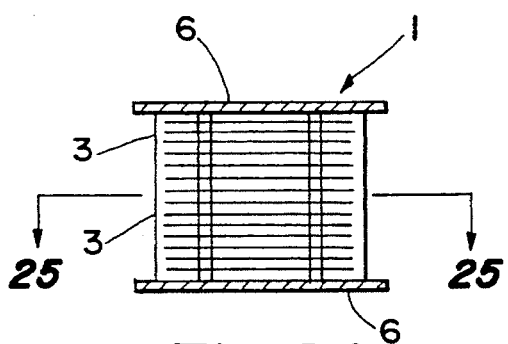
FIG. 24 is an elevational view in section of a preferred embodiment of the invention similar to FIG. 8, but reinforced with disk-shaped steel plates.
Figure 25:
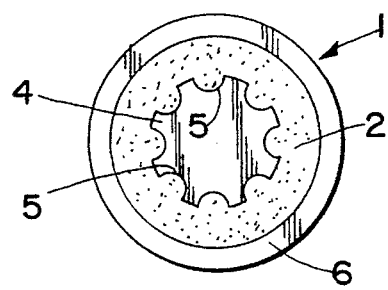
FIG. 25 is a plan view of a preferred embodiment of the invention taken along the line 25—25 of FIG. 24.
Figure 26:
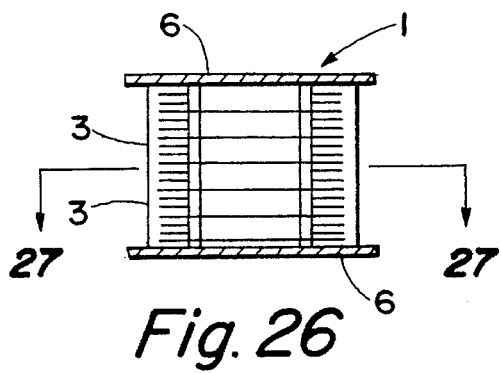
FIG. 26 is an elevational view in section of a preferred embodiment of the invention similar to the embodiments of the invention shown in FIGS. 8 and 24, but reinforced with ring-shaped steel plates and disk-shaped steel plates.
Figure 27:
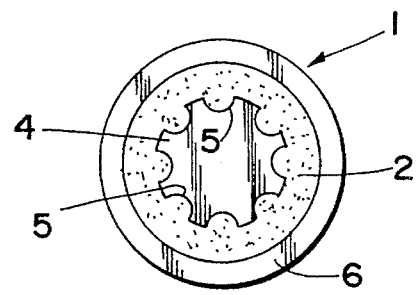
FIG. 27 is an elevational view in section of a preferred embodiment of the invention taken along the line 27—27 of FIG. 26.

The inventive devices shown in FIGS. 8 through 14 are also reinforced with ring-shaped plates 3. However, they may also be reinforced with disk-type plates 3B, as shown in FIGS. 24 and 25, wherein the plates 3B may be used in lieu of ring-shaped plates 3. In the alternative, as shown in FIGS. 26 and 27, disk-type plates may be interposed between the ring-shaped plates 3.

Figure 15:
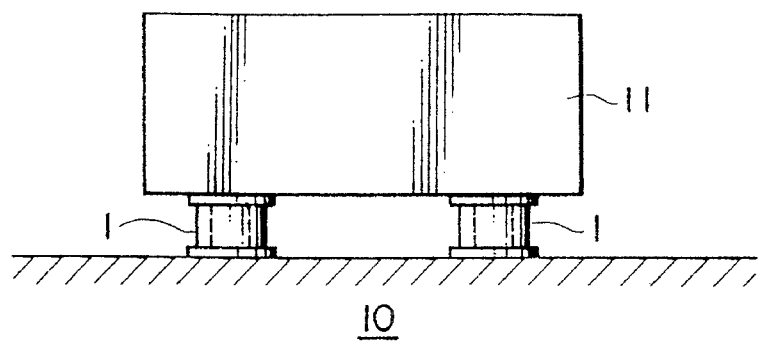
FIG. 15 is an elevational view of a passive vibration control device for a structure utilizing an inventive laminated rubber support.
Figure 16:
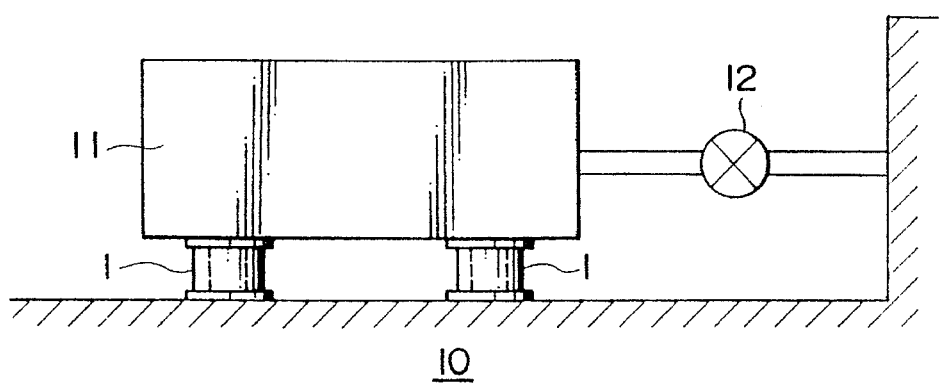
FIG. 16 is an elevational view of an active vibration control device for a structure utilizing an inventive laminated rubber support.
Figure 17:
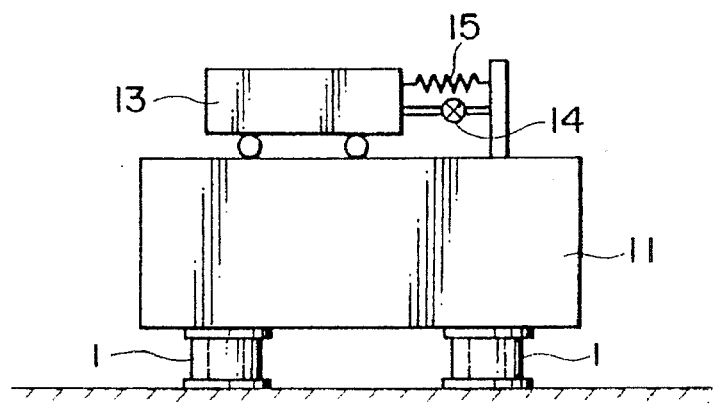
FIG. 17 is an elevational view of an active spring-balanced vibration control device for a structure utilizing an inventive laminated rubber support.
Figure 18:
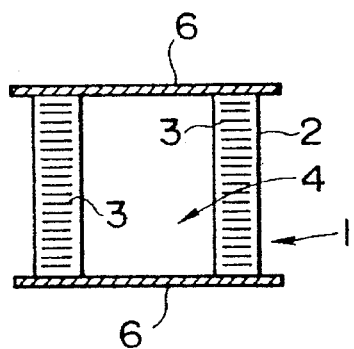
FIG. 18 is an elevational view in section of a prior art laminated rubber support.
Figure 19:
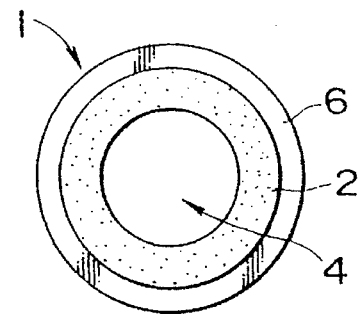
FIG. 19 is a plan view in horizontal section of a prior art laminated rubber support taken along the line 19—19 of FIG. 18.

FIGS. 15 through 17 show embodiments of vibration control devices for a structure in which the inventive laminated rubber supports are used.

FIG. 15 shows an additional mass body 11 supported by a plurality of laminated rubber supports 1 on a structure 10. If the mass of the structure 10 on which the inventive device is mounted is expressed as $m_1$, the mass of the additional mass body 11 is expressed as $m_d$, the spring constant of the main body of the structure is expressed as $k_1$, the spring constant of the laminated rubber support 1 is expressed as $k_d$, and the damping coefficient is expressed as $c_d$, then the intrinsic angular frequency $\omega_1$ of the structure 10, comprising a main vibration system, may be expressed as:

$$\omega_1 = (k_1/m_1)^{1/2}$$

The mass $m_d$ of the additional mass body 11, comprising a vibration absorption system, is selected so that the ratio u of the mass $m_d$ to the mass $m_1$ of the structure 10 may be $$\mu = m_d/m_1 \geq 0.01$$

and at this time the intrinsic angular frequency of the vibration absorption system $\omega_d$ is given by:

$$\omega_d = (1/1+\mu)\omega_1$$

Then, the damping coefficient $c_d$ and the damping factor $h_d$ are expressed by:

$$c_d = 2m_d\omega_d h_d$$

$$h_d = [3\mu/8(1+\mu)]^{1/2}$$

FIG. 16 shows an additional mass body 11, wherein a control force u(t), due to an oil pressure from an actuator 12 or an electromagnetic force or the like, is applied to the additional mass body 11 which is supported on inventive laminated rubber supports 1 to actively control the vibration of the structure 10.

The spring, i.e., the inventive laminated rubber support 1, between the main body of the structure 10 and the additional mass body 11, comprising the vibration control device, is kept in a soft state, e.g., $$\omega_d \leq (1/2)\omega_1$$

wherein the control force u(t) may be expressed in the equation:

$$u(t) = G_1(dx_1/dt) + G_2(dx_d/dt)$$

$G_1$ and $G_2$ represent circuit gains, $x_1$ is a displacement of the structure 10 and $x_d$ is a displacement of a first additional mass body. $G_1$ represents a gain in a circuit to the response speed of the structure. Furthermore, the second term in the above equation expresses a damping property to the additional mass body 11 by adding the product resulting from multiplying a gain $G_2$ (minus sign) by the vibration speed of the additional mass body 11 to the control force, wherein more stabilization is attained.

The spring constant $k_d$ is set so that the vibration of the additional mass body 11 may be synchronized with the vibration of the structure 10, that is:

$\omega_d = \omega_1$ and the control force u(t) is given in the form of the following equation, e.g., $$u(t) = G_1(dx/dt) + G_2(dx_d/dt) + G_3(x_1 - x_d)$$

wherein $G_3$ is a gain, having a minus sign, and a part of the intertial force acting on the additional mass body 11 at the time of vibration is canceled by the third term of the above equation so as to allow the additional mass body 11 to vibrate by a minimal control force.

As shown in FIG. 17, a second additional mass body 13, having a predetermined mass $m_b$, is mounted on additional mass body 11 having the predetermined mass $m_a$. The control force u(t) is added by an actuator 14 and spring 15 between the first additional mass body 11 and the second additional mass body 13 to actively control the vibration of the structure. Thus maximum vibration control effect can be obtained by a minimal control force. Vibration of a structure 10 having a long period is possible by supporting the additional mass body 11 by means of the inventive laminated rubber support 1, and since the deformability of the inventive device is great, the resulting vibration control can be accomplished effectively.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

We claim:

1. A hollow core support and damper comprising: a plurality of vertically stacked rubber members having center openings and upper and lower parallel planar surfaces; first steel plates with like center openings interposed between and secured to adjacent rubber members, said stacked rubber members and said steel plates forming inner and outer wall surfaces to define a hollow core; a pair of imperforate second steel plates, one of which is secured to the said upper planar surface of the uppermost of said vertically stacked rubber members and the other of which is secured to said lower planar surface of the lowermost of said vertically stacked rubber members to sandwich said hollow core therebetween to form and to maintain an imperforate enclosed hollow chamber; at least one of said wall surfaces being configured to resist buckling of said damper due to horizontal deformation; a first horizontally vibration mass; a second horizontally vibratable mass; a plurality of said hollow core supports being positioned between said first horizontally vibratable mass and said second horizontally vibratable mass to position and to support said second horizontally vibratable mass vertically above said first horizontally vibratable mass, whereby said hollow core damper provides a high seismic vibration induced horizontal stroke, low horizontal shearing stiffness, and a long horizontal vibration period; whereby said second horizontally vibratable mass is free to vibrate passively on said plurality of said hollow core supports in response to horizontal seismic vibrations impacting said first horizontally vibratable mass; and wherein said inner wall surface of at least one said hollow core support is vertical and includes a plurality of reinforcing ribs.

2. The hollow core building support and damper of claim 1, wherein said reinforcing ribs are laterally spaced apart.

3. The hollow core building support and damper of claim 2, wherein said reinforcing ribs are evenly spaced apart.

4. The hollow core building support and damper of claim 2, wherein said reinforcing ribs are parallel.

5. The hollow core building support and damper of claim 1, wherein said reinforcing ribs are vertically aligned.

6. The hollow core building support and damper of claim 5, wherein said outer wall surface is vertical and includes a plurality of reinforcing ribs.

7. The hollow core building support and damper of claim 6, wherein said reinforcing ribs are spaced apart.

8. The hollow core building support and damper of claim 7, wherein said reinforcing ribs are parallel.

9. The hollow core building support and damper of claim 6, wherein said reinforcing ribs are evenly spaced apart.

10. The hollow core building support and damper of claim 1, wherein said inner and outer wall surfaces are vertical and each includes a plurality of reinforcing ribs.

11. The hollow core building support and damper of claim 10, wherein said reinforcing ribs of at least one of said wall surface are spaced apart.

12. The hollow core building support and damper of claim 11, wherein said reinforcing ribs of at least one of said wall surfaces are evenly spaced apart.

13. The hollow core building support and damper of claim 10, wherein said reinforcing ribs of at least one of said wall surfaces are parallel.

14. The hollow core building support and damper of claim 10, wherein said reinforcing ribs of at least one of said wall surfaces are vertically aligned.

15. A hollow core building support and damper comprising: a plurality of vertically stacked rubber members having center openings and upper and lower parallel planar surfaces; first steel plates with like center openings interposed between and secured to adjacent rubber members, said stacked rubber members and said steel plates forming inner and outer wall surfaces to define a hollow core; a pair of imperforate second steel plates, one of which is secured to the said upper planar surface of the uppermost of said vertically stacked rubber members and the other of which is secured to said lower planar surface of the lowermost of said vertically stacked rubber members to sandwich said hollow core therebetween to form and to maintain an imperforate enclosed hollow chamber; at least one of said wall surfaces being configured to resist buckling of said damper due to horizontal deformation; a first horizontally vibratable mass; a second horizontally vibratable mass; a plurality of hollow core supports and dampers being positioned between said first horizontally vibratable mass and said second horizontally vibratable mass to position and to support said second horizontally vibratable mass vertically above said first horizontally vibratable mass; and a horizontal vibration actuator secured between said first horizontally vibratable mass and said second horizontally vibratable mass, said horizontal vibration actuator being adapted to positively vibrate said second horizontally vibratable mass responsive to horizontal seismic vibration impacting on said first horizontally vibratable mass, whereby said hollow core support and damper provide a high seismic vibration induced horizontal stroke, low horizontal shearing stiffness, and a long horizontal vibration period.

16. A hollow core support and damper comprising: a plurality of vertically stacked rubber members having center openings and upper and lower parallel planar surfaces; first steel plates with like center openings interposed between and secured to adjacent rubber members, said stacked rubber members and said steel plates forming inner and outer wall surfaces to define a hollow core; a pair of imperforate second steel plates, one of which is secured to the said upper planar surface of the uppermost of said vertically stacked rubber members and the other of which is secured to said lower planar surface of the lowermost of said vertically stacked rubber members to sandwich said hollow core therebetween to form and to maintain an imperforate enclosed hollow chamber; at least one of said wall surfaces being configured to resist buckling of said damper due to horizontal deformation; a first horizontally vibratable mass; a second horizontally vibratable mass; a plurality of hollow core supports being positioned between said first horizontally vibratable mass and said second horizontally vibratable mass to position and to support said second horizontally vibratable mass vertically above said first horizontally vibratable mass; a third horizontally vibratable mass supported on said second horizontally vibratable mass; and a horizontal vibration actuator secured between said second horizontal vibratable mass and said third horizontal vibratable mass, said horizontal vibration actuator being adapted to positively vibrate said third horizontally vibratable mass responsive to horizontal seismic vibration impacting on said first horizontally vibratable mass, whereby said hollow core support and damper provide a high seismic vibration induced horizontal stroke, low horizontal shearing stiffness, and a long horizontal vibration period.

* * * * *